US012608980B2

(12) United States Patent
Park et al.

(10) Patent No.: US 12,608,980 B2
(45) Date of Patent: Apr. 21, 2026

(54) METHOD FOR SEGMENTING SIGN LANGUAGE INTO MORPHEMES, METHOD FOR PREDICTING MORPHEME POSITIONS, AND METHOD FOR AUGMENTING DATA

(71) Applicant: Korea Electronics Technology Institute, Seongnam-si (KR)

(72) Inventors: Han Mu Park, Seongnam-si (KR); Jin Yea Jang, Seongnam-si (KR); Sa Im Shin, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 258 days.

(21) Appl. No.: 18/289,958

(22) PCT Filed: Jun. 20, 2022

(86) PCT No.: PCT/KR2022/008665
§ 371 (c)(1),
(2) Date: Nov. 8, 2023

(87) PCT Pub. No.: WO2023/277421
PCT Pub. Date: Jan. 5, 2023

(65) Prior Publication Data
US 2024/0249558 A1 Jul. 25, 2024

(30) Foreign Application Priority Data
Jun. 29, 2021 (KR) ........................ 10-2021-0084889

(51) Int. Cl.
*G06V 40/20* (2022.01)
*G06V 10/774* (2022.01)
(Continued)

(52) U.S. Cl.
CPC ............ *G06V 40/28* (2022.01); *G06V 10/774* (2022.01); *G06V 20/46* (2022.01); *G06V 20/49* (2022.01); *G06V 40/175* (2022.01)

(58) Field of Classification Search
CPC ........ G06V 40/28; G06V 20/49; G06V 20/46; G06V 40/175; G06V 10/774
See application file for complete search history.

(56) References Cited

U.S. PATENT DOCUMENTS

2019/0026546 A1 1/2019 Mahmoud et al.

FOREIGN PATENT DOCUMENTS

JP 6353660 B2 7/2018
JP 2020-177196 A 10/2020
(Continued)

OTHER PUBLICATIONS

Ko SK, Kim CJ, Jung H, Cho C. Neural sign language translation based on human keypoint estimation. Applied sciences. Jul. 1, 2019;9(13):2683. (Year: 2019).*
(Continued)

*Primary Examiner* — David Perlman
(74) *Attorney, Agent, or Firm* — NSIP Law

(57) ABSTRACT

Provided are a method for segmenting sign language into morphemes, a method for predicting morpheme positions, and a method for augmenting data. A system for analyzing sign language according to an embodiment of the present invention comprises: a recognition unit which recognizes key points of a speaker from a sign language video; and a prediction unit which inputs the recognized key points into an artificial intelligence model, segments the sign language into morphemes, and predicts position information of the segmented morphemes. Accordingly, by recognizing the morphemes of the sign language video frame by frame on the basis of a skeletal model and thereby segmenting the sign (Continued)

language into morphemes and predicting morpheme positions, it is possible to lay the foundations for accurate sign language translation.

20 Claims, 7 Drawing Sheets

(51) Int. Cl.
G06V 20/40 (2022.01)
G06V 40/16 (2022.01)

(56) References Cited

FOREIGN PATENT DOCUMENTS

| | | | |
|---|---|---|---|
| KR | 10-2115551 | B1 | 5/2020 |
| KR | 10-2167760 | B1 | 10/2020 |
| KR | 10-2195401 | B1 | 12/2020 |

OTHER PUBLICATIONS

Bull, H., Afouras, T., Varol, G., Albanie, S., Momeni, L., & Zisserman, A. (2021). Aligning subtitles in sign language videos. In Proceedings of the IEEE/CVF international conference on computer vision (pp. 11552-11561). (Year: 2021).*
International Search Report No. PCT/KR2022/008665 Issued on Sep. 29, 2022 (3 Pages in Korean).
Korean Office Action Issued on Jul. 10, 2023, in Counterpart Korean Patent Application No. 10-2021-0084889 (7 Pages in Korean, 6 Pages in English).

* cited by examiner

<u>110</u>

120

SIGN LANGUAGE
DATABASE FOR
TRAINING(111)

RECOGNIZE MORPHEMES
ON FRAME BASIS

NORMALIZED KEY POINTS

210

211
NEW SIGN LANGUAGE
VIDEO ACQUISITION
MODULE

212
KEY POINT
EXTRACTION MODULE

220

221
DATA
NORMALIZATION
MODULE

222
FRAME-BASED
MORPHEME
RECOGNITION
NETWORK

223
MORPHEME
COMBINATION DATA
AUGMENTATION
MODULE

METHOD FOR SEGMENTING SIGN LANGUAGE INTO MORPHEMES, METHOD FOR PREDICTING MORPHEME POSITIONS, AND METHOD FOR AUGMENTING DATA

CROSS REFERENCE TO RELATED APPLICATIONS

This application is a U.S. National Stage Application of International Application No. PCT/KR2022/008665, filed on Jun. 20, 2022, which claims the benefit under 35 USC 119(a) and 365(b) of Korean Patent Application No. 10-2021-0084889, filed on Jun. 29, 2021, in the Korean Intellectual Property Office, the entire disclosure of which is incorporated herein by reference for all purposes.

TECHNICAL FIELD

The disclosure relates to artificial intelligence (AI) technology, and more particularly, to a method for segmenting sign language in a sign language video into morphemes by using an AI model, and predicting frames in which segmented morphemes are positioned.

BACKGROUND ART

Sign languages refers to language that the deaf and dumb use to communicate with each other. With the rapid development of artificial intelligence (AI) technology, it is possible to automatically recognize sign language from a sign language video.

In order to create a sign language translation model of high performance, a huge amount of sign language data is required. A learning-based model that translates sign languages into language may require much data, but there is a limit to resources for constructing data and much time and cost are required. Sign language that a sign language translation model can translates into language is limited due to limited sign language data, and is very dependent on constructed data.

There is a related-art method for predicting enumerated words corresponding to sign language morphemes in a sign language video, but this method may not predict in which section each morpheme is generated in a sign language video. This may degrade accuracy of sign language translation.

DISCLOSURE

Technical Problem

The disclosure has been developed in order to address the above-discussed deficiencies of the prior art, and an object of the disclosure is to provide a method and a system for recognizing morphemes of a sign language video on a frame basis based on a skeleton model, segmenting sign language into morphemes and predicting positions of morphemes, and augmenting sign language data for training by combining morphemes acquired as a result of predicting.

Technical Solution

According to an embodiment of the disclosure to achieve the above-described object, a sign language analysis system may include: a recognition unit configured to recognize key points of a speaker from a sign language video; and a prediction unit configured to input the recognized key points into an AI model, and to segment sign language into morphemes and to predict position information of the segmented morphemes.

The recognition unit may recognize key points of a speaker from a sign language video on a frame basis, and the prediction unit may predict position information of morphemes on a frame basis.

The position information of the morphemes may be information on frames in which morphemes are positioned among frames constituting the sign language video.

The key points may include joint information of body and hand of the speaker and facial expression information of the speaker.

The AI model may receive key points on a frame basis, may predict which morpheme a current frame corresponds to, and may output a result of predicting.

According to an embodiment of the disclosure, the sign language analysis system may further include a training unit configured to recognize key points of a speaker from a sign language video for training, and to train the AI model by using the recognized key points and morpheme information of the sign language video for training.

According to an embodiment of the disclosure, the sign language analysis system may further include an augmentation unit configured to augment training data by combining morphemes outputted from the prediction unit.

In addition, the augmentation unit may augment the training data by changing an order of the morphemes.

In addition, the augmentation unit may augment the training data by deleting some of the morphemes.

According to another embodiment of the disclosure, a sign language analysis method may include: recognizing key points of a speaker from a sign language video; and inputting the recognized key points into an AI model, and segmenting sign language into morphemes and predicting position information of the segmented morphemes.

According to still another embodiment of the disclosure, a sign language analysis system may include: a training unit configured to recognize key points of a speaker from a sign language video for training, and to train an AI model by using the recognized key points and morpheme information of the sign language video for training; and a prediction unit configured to recognize key points of a speaker from a sign language video, to input the recognized key points into the AI model which is trained by the training unit, to segment sign language into morphemes, and to predict position information of the segmented morphemes.

According to yet another embodiment of the disclosure, a sign language analysis method may include: recognizing key points of a speaker from a sign language video for training, and training an AI model by using the recognized key points and morpheme information of the sign language video for training; and recognizing key points of a speaker from a sign language video, inputting the recognized key points into the AI model which is trained by the training step, segmenting sign language into morphemes, and predicting position information of the segmented morphemes.

Advantageous Effects

According to embodiments of the disclosure as described above, by recognizing morphemes of a sign language video on a frame basis based on a skeleton model and thereby segmenting sign language into morphemes and predicting positions of morphemes, it is possible to lay the foundations for accurate sign language translation.

In addition, according to embodiments of the disclosure, by augmenting sign language data for training by variously combining predicted morphemes, training of a sign language recognition model can be reinforced and accuracy of prediction can be further enhanced.

BEST MODE

Hereinafter, the disclosure will be described in more detail with reference to the drawings.

Embodiments of the disclosure propose a method for segmenting sign language in a sign language video into morphemes by using an AI model, predicting frames in which segmented morphemes are positioned, and augmenting training data of the AI model.

Sign language has different meanings according to a position and a motion of body and hand of a speaker, a shape of a finger, a facial expression. In an embodiment of the disclosure, sign language may be recognized based on joint information and a facial expression of a speaker.

Sign language differs from the language grammatical system, but has morphemes constituting one sign language sentence. In an embodiment of the disclosure, sign language may be segmented into morphemes and positions of morphemes may be predicted on a frame basis.

Furthermore, in an embodiment of the disclosure, morphemes which are acquired as a result of predicting may be variously combined and various combinations of morphemes may be used for augmenting training data.

Figure 1:
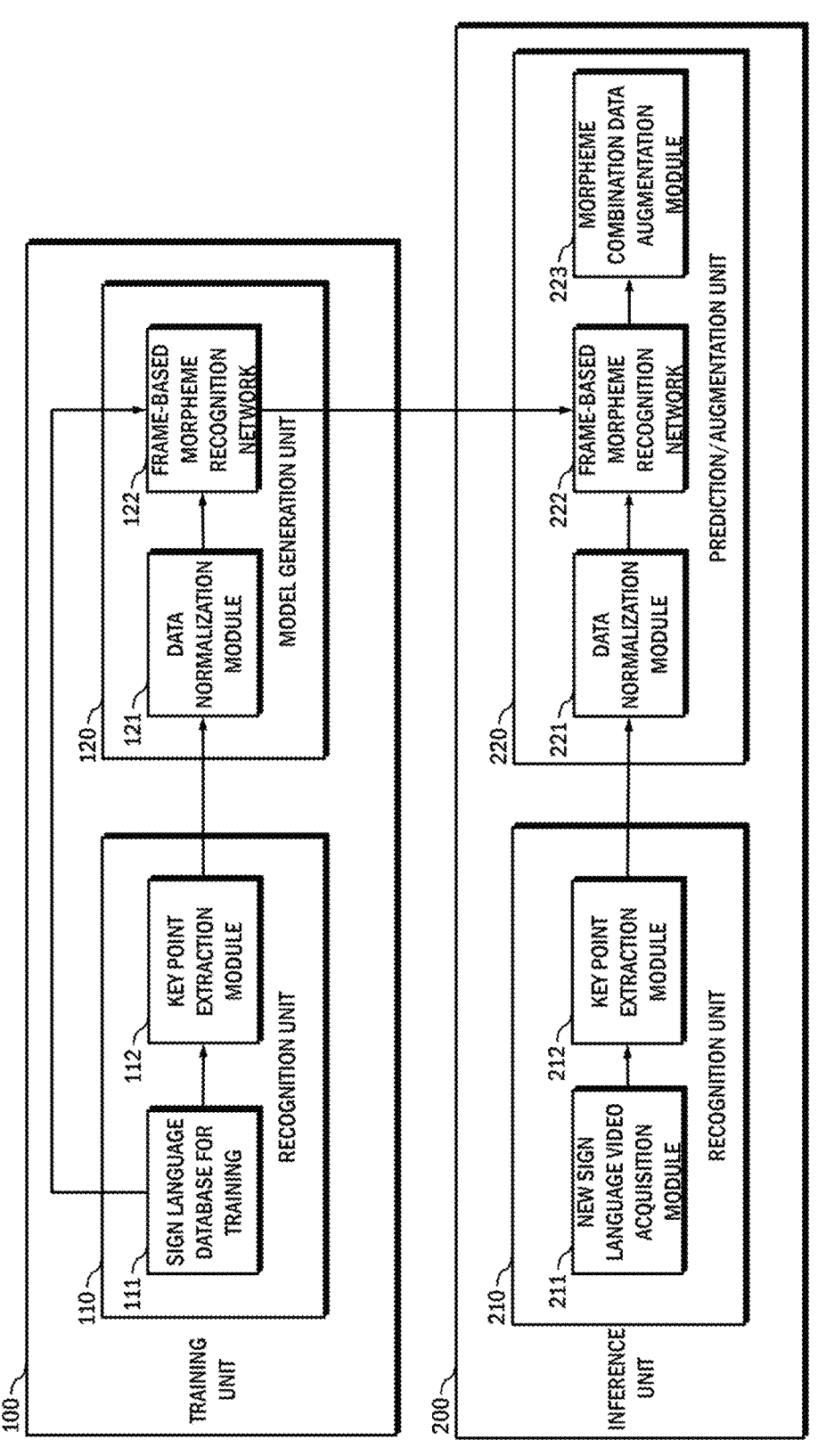
FIG. 1 is a block diagram of an AI-based sign language analysis system according to an embodiment of the disclosure.

FIG. 1 is a block diagram of an AI-based sign language analysis system according to an embodiment of the disclosure. A sign language analysis system according to an embodiment of the disclosure may include a training unit 100 and an inference unit 200.

The training unit 100 may be configured to train an AI model for analyzing sign language, and may include a recognition unit 110 and a model generation unit 120.

The recognition unit 100 may recognize joint information of body and hand of a speaker who uses sign language and facial expression information of the speaker from a sign language video for training on a frame basis.

The model generation unit 120 may train an AI model that segments sign language into morphemes based on information recognized by the recognition unit 110, and predicts position information of the segmented morphemes on a frame basis.

The inference unit 200 may analyze sign language in a sign language video to infer by using the AI model trained by the model generation unit 120, and may augment training data based on analyzed sign language data. The inference unit 200 may include a recognition unit 210 and a prediction/augmentation unit 220.

The recognition unit 210 may recognize joint information of body and hand of a speaker and facial expression information of the speaker from a sign language video to infer on a frame basis.

The prediction/augmentation unit 220 may segment sign language into morphemes by using the AI model trained by the model generation unit 120, based on information recognized by the recognition unit 210, and may predict position information of the segmented morphemes on a frame basis.

In addition, the prediction/augmentation unit 220 may augment training data by variously combining morphemes acquired as a result of predicting.

Figure 2:
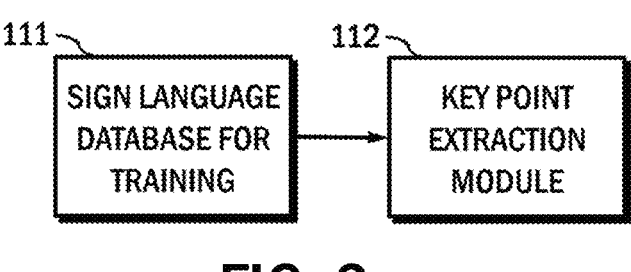
FIG. 2 is a block diagram of a recognition unit provided in a training unit of FIG. 1.

FIG. 2 is a block diagram of the recognition unit 110 provided in the training unit 100 shown in FIG. 1. As shown in FIG. 2, the recognition unit 110 may include a sign language database 111 for training, and a key point extraction module 112.

The sign language database 111 for training is a database in which sign language videos for training are stored and morpheme position information on videos are stored with annotations (labels).

The key point extraction module 112 may receive an input of a sign language video for training, which is stored in the sign language database 111 for training, and may extract joint information of body and hand of a speaker and facial expression information of the speaker as key points.

Figure 3:
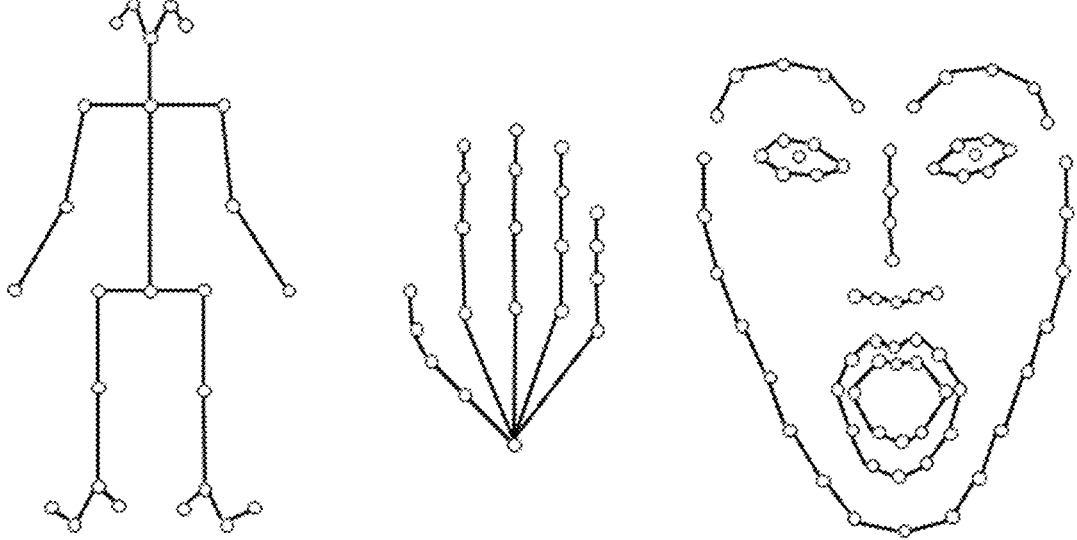
FIG. 3 is a view illustrating a result of extracting key points.

By extracting key points, all unnecessary elements that may exist in image frames except for a motion or a facial expression of the speaker may be removed. FIG. 3 illustrates a result of extracting key points. As shown in FIG. 3, information of positions of key points may be acquired from the body, hand, face of a speaker. In FIG. 3, positions expressed by circles are key points, and lines are just drawn for easy explanation of a shape and do not correspond to key points.

Figure 4:
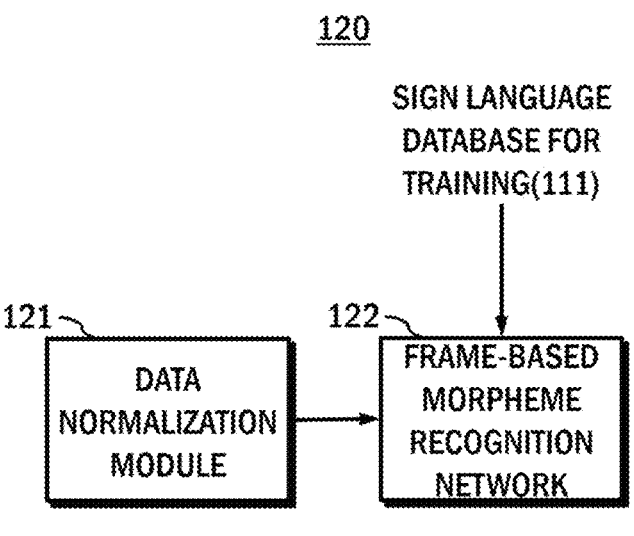
FIG. 4 is a block diagram of a model generation unit provided in the training unit.

FIG. 4 is a block diagram of the model generation unit 120 provided in the training unit 100 shown in FIG. 1. As shown in FIG. 4, the model generation unit 120 may include a data normalization module 121 and a frame-based morpheme recognition network 122.

The data normalization module 121 may normalize key points that are extracted by the key point extraction module 112. Persons may have different body types and different positions in an image. Accordingly, data may be normalized and normalized key points may be used as input data to the frame-based morpheme recognition network 122.

The frame-based morpheme recognition network 122 is an AI model that segments sign language into morphemes by using normalized key points as an input, and predicts positions information of the segmented morphemes on a frame basis.

Figure 5:
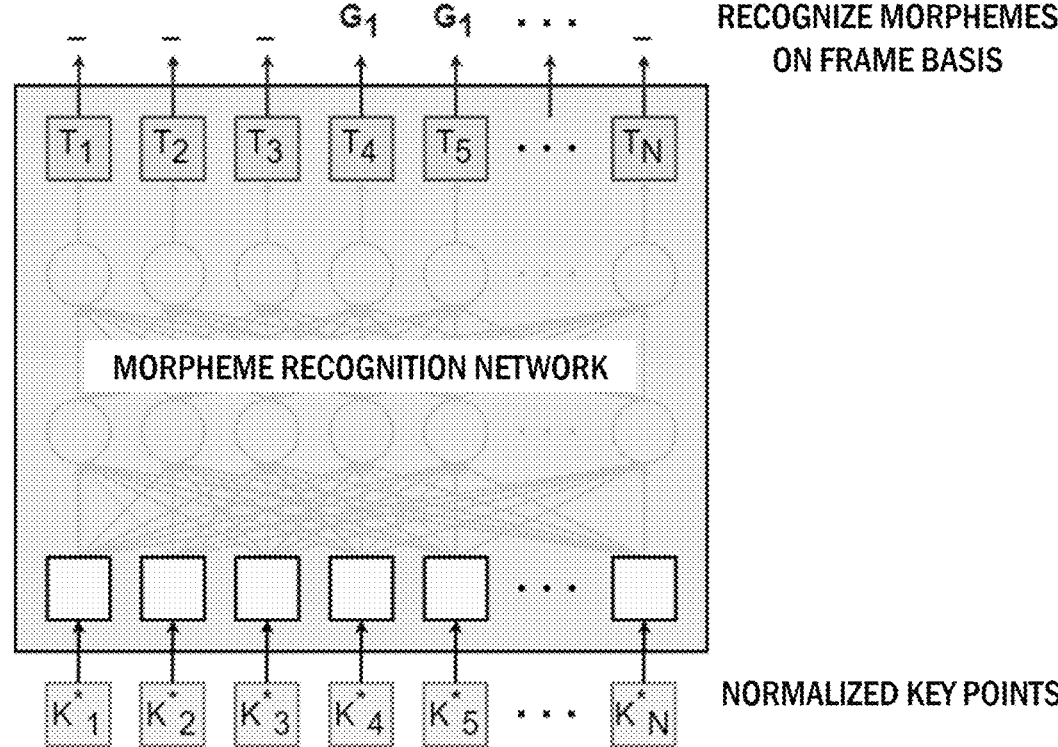
FIG. 5 is a view illustrating a detailed configuration of a frame-based morpheme recognition network.

FIG. 5 illustrates a detailed configuration of the frame-based morpheme recognition network 122. As shown in FIG. 5, the frame-based morphemes recognition network 122 is a network that receives key points normalized on a frame basis and recognizes morphemes on a frame basis, that is, recognizes which morpheme a current frame corresponds to.

Figure 6:
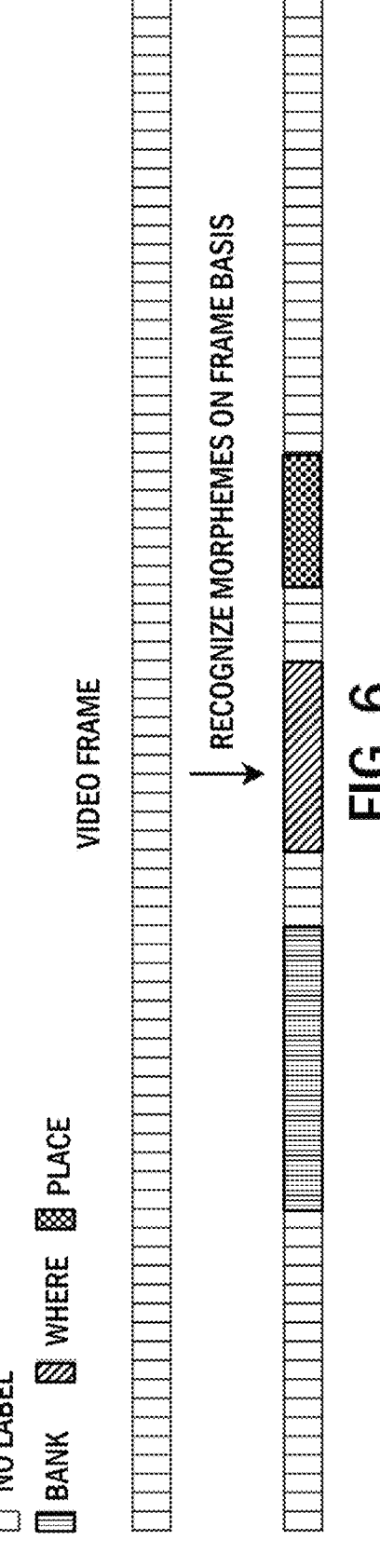
FIG. 6 is a view illustrating a result of recognizing morpheme positions on a frame basis by the frame-based morpheme recognition network.

FIG. 6 illustrates a result of recognizing morpheme positions on a frame basis by the frame-based morpheme recognition network 122. As shown in FIG. 6, the frame-based morpheme recognition network 122 recognizes in which frames morphemes constituting sign language are positioned, that is, which morpheme each frame constituting a video indicates, and provides a result of recognizing.

The frame-based morpheme recognition network 122 is trained so as to minimize a loss in the result of predicting and morpheme position information on a corresponding sign language video, which is stored in the sign language database 111 for training.

Figures 7, 8:
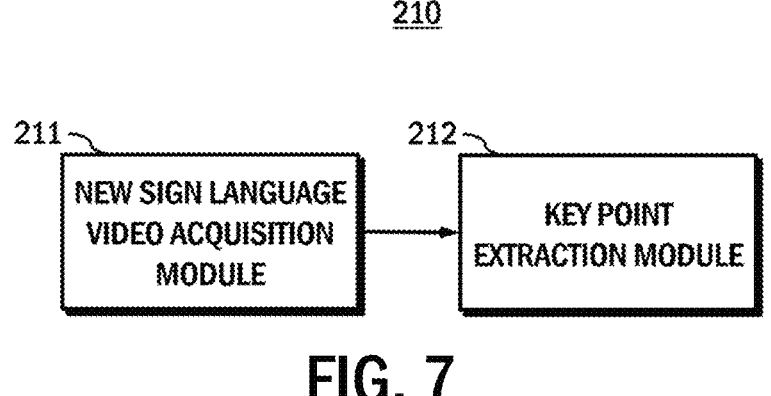
FIG. 7 is a block diagram of a recognition unit provided in an inference unit shown in FIG. 1.
FIG. 8 is a block diagram of a prediction/augmentation unit shown in FIG. 1.

FIG. 7 is a block diagram of the recognition 210 provided in the inference unit 200 shown in FIG. 1. As shown in FIG. 7, the recognition 210 may include a new sign language image acquisition module 211 and a key point extraction module 212.

The sign language acquisition module 211 may acquire a new sign language video, that is, a sign language video to infer, and may input the new sign language video to the key point extraction module 212.

The key point extraction module 212 may extract joint information of body and hand of a speaker and facial expression information of the speaker from the inputted sign language video as key points. A detailed function of the key point extraction module 212 is the same as a detailed function of the key point extraction module 112 of the training unit 100.

FIG. 8 is a block diagram of the prediction/augmentation unit 220 shown in FIG. 1. As shown in FIG. 8, the prediction/augmentation unit 220 may include a data normalization module 221, a frame-based morpheme recognition network 222, and a morpheme combination data augmentation module 223.

The data normalization module 221 may normalize key points which are extracted by the key point extraction module 212. The normalized key points may be used as input data of the frame-based morpheme recognition network 222.

The frame-based morpheme recognition network 222 is the frame-based morpheme recognition network 122 that is trained by the model generation unit 120. The frame-based morpheme recognition network 222 may segment sign language into morphemes by using key points which are normalized by the data normalization module 221 as an input, and may predict position information of the segmented morphemes on a frame basis.

The morpheme combination data augmentation module 223 may augment training data by variously combining morphemes which are acquired as a result of predicting by the frame-based morpheme recognition network 222.

Figure 9:
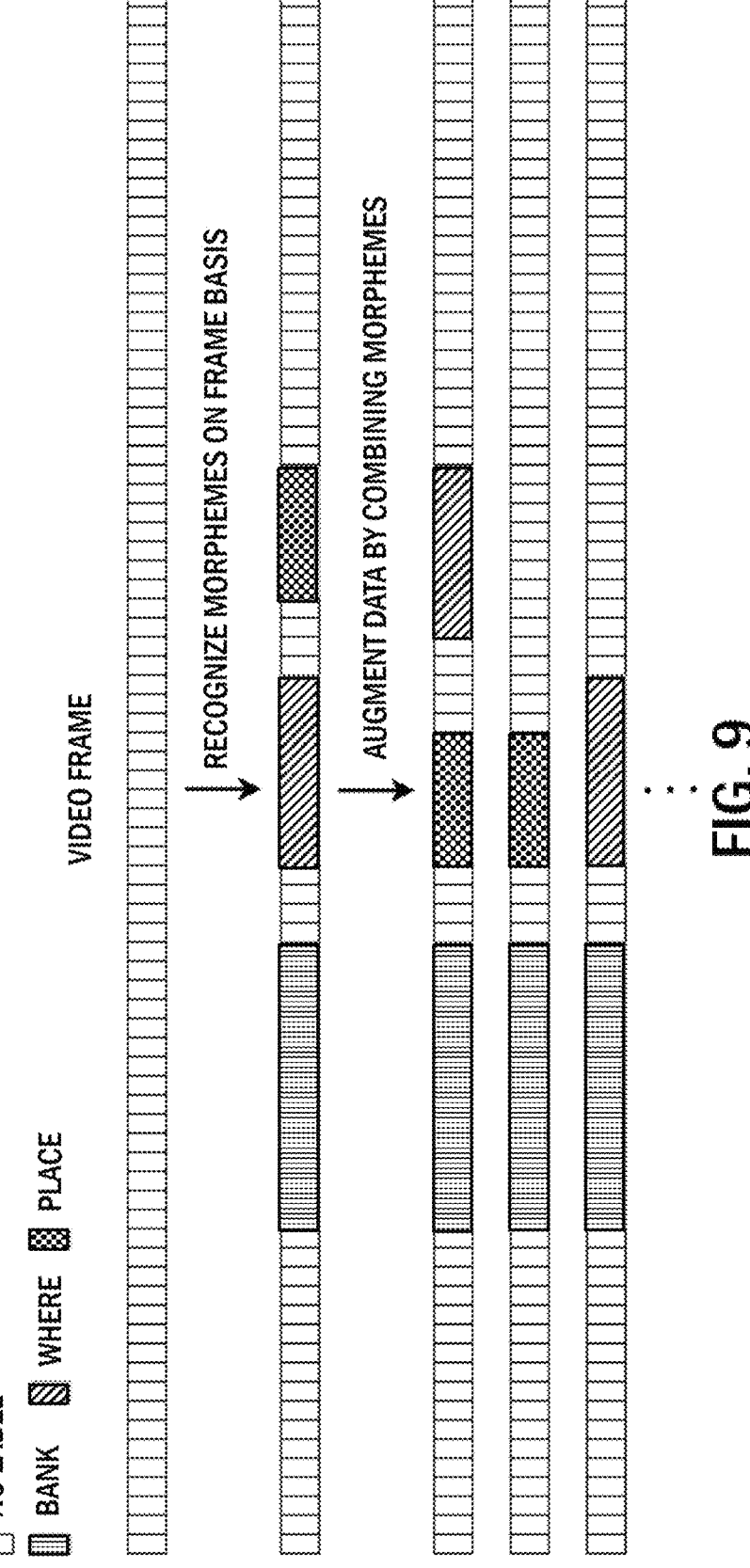
FIG. 9 is a view illustrating an example of augmenting training data by a morpheme combination data augmentation module.

FIG. 9 illustrates an example of augmenting training data by the morpheme combination data augmentation module 223. When a sentence, "Where is the bank?", is expressed as sign language, the sign language may be comprised of sign language morphemes ["bank", "where", "place" ].

The sign language database 111 for training may have a sign language video that is expressed in the above order, and, if the frame-based morpheme recognition network 222 has been trained with this training data, a sign language video made in order of ["bank", "where", "place" ] may be properly inferred.

However, when sign language is spoken, the order of morphemes may be changed to ["bank", "place", "where" ] according to a person who does sign language, and sometimes, a person may express ["bank", "place" ] by omitting a morpheme. In order to constitute a robust sign language recognition model, there is a need for a meaningful morpheme combination that does not exist in the sign language database 111 for training.

Accordingly, the morpheme combination data augmentation module 223 may augment data by combining morpheme-based sign language video frames from the result of recognizing a meaning and a position of a morpheme in each frame.

FIG. 9 illustrates an example of augmenting a sign language video made in order of ["bank", "where", "place" ] to a sign language video made in order of ["bank", "place", "where" ], a sign language video made in order of ["bank", "place" ], and a sign language video made in order of ["bank", "where" ].

The augmented sign language videos may be stored in the sign language database 111 for training with annotations indicating position information of the morphemens, and may be used as training data.

Figure 10:
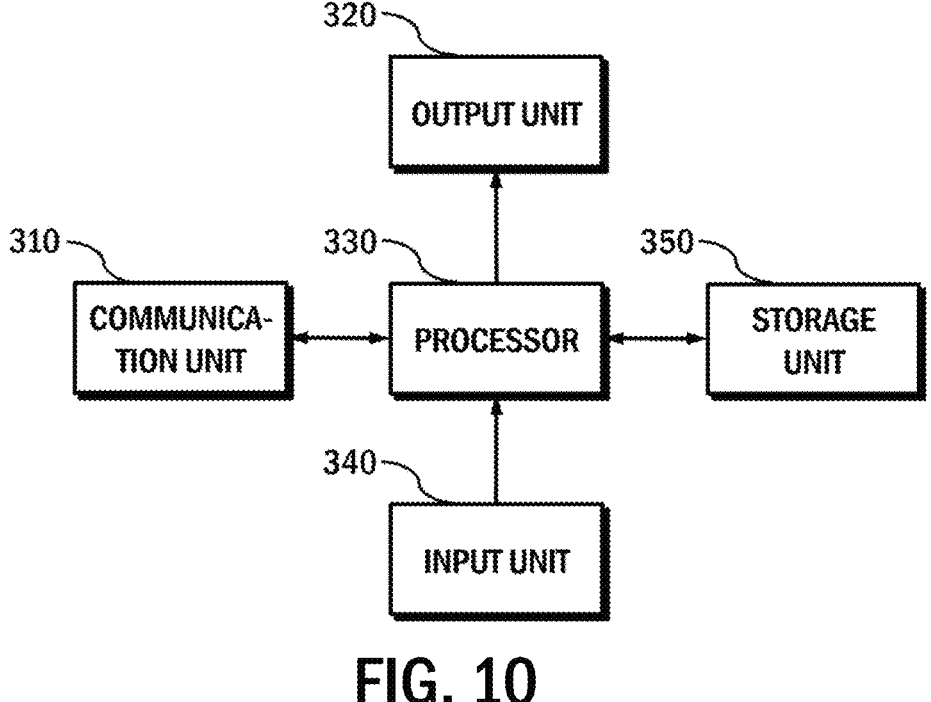
FIG. 10 is a view illustrating a hardware structure which implements the AI-based sign language analysis system shown in FIG. 1.

FIG. 10 is a view illustrating a hardware structure for implementing the AI-based sign language analysis system shown in FIG. 1.

The system according to an embodiment of the disclosure may be implemented by a computing system that is established by including a communication unit 310, an output unit 320, a processor 330, an input unit 330, and a storage unit 350.

The communication unit 310 is a communication means for communicating with an external device and accessing an external network. The output unit 320 is a display for displaying a result of executing by the processor 330, and the input unit 330 is a user input means for delivering a user command to the processor 330.

The processor 330 is configured to perform functions of the AI-based sign language analysis system shown in FIG. 1, and includes a plurality of graphics processing units (GPUs) and a central processing unit (CPU).

The storage unit 350 provides a storage space necessary for operations and functions of the processor 330.

Up to now, a method for segmenting sign language into morphemes, a method for predicting positions of morphemes, and a method for augmenting data have been described in detail with reference to preferred embodiments.

In the above-described embodiments, by recognizing morphemes of a sign language video on a frame basis based on a skeleton model and thereby segmenting sign language into morphemes and predicting positions of morphemes, it is possible to lay the foundations for accurate sign language translation.

In addition, by augmenting sign language data for training by variously combining predicted morphemes, training of a sign language recognition model can be reinforced and accuracy of prediction can be further enhanced.

The technical concept of the disclosure may be applied to a computer-readable recording medium which records a computer program for performing the functions of the apparatus and the method according to the present embodiments. In addition, the technical idea according to various embodiments of the disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the disclosure have been illustrated and described, the disclosure is not limited to the above-described specific embodiments. Various changes can be made by a person skilled in the art without departing from the scope of the disclosure claimed in claims, and also, changed embodiments should not be understood as being separate from the technical idea or prospect of the disclosure.

The invention claimed is:

1. A sign language analysis system comprising:
one or more processors configured to:
recognize key points of a speaker from a sign language video, including extracting key-point data including body, hand, and facial features from each frame of the sign-language video so that each feature of the key-point data is recognized in a corresponding frame temporal order and frame groups, from among frames of the sign-language video, are identified as temporally contiguous frame segments each corresponding to a candidate morpheme interval according to temporal continuity of the frames in the sign language video;
input the recognized key points into an artificial intelligence (AI) model;
segment sign language into morphemes, using the AI model;
predict position information of the segmented morphemes, using the AI model,
wherein the AI model is trained to minimize a loss in the predicting position information of the segmented morphemes and the AI model is used in performing frame-based morpheme recognition of the sign language video on a frame basis, thereby improving accuracy of sign language translation during the frame-based morpheme recognition;
generate additional training data by combining or omitting morpheme segments to enhance robustness of the AI model; and
train the AI model using training data including recognized key-point data, morpheme information of the sign language video, and the generated additional training data, thereby enhancing the robustness of the AI model.

2. The sign language analysis system of claim 1, wherein the one or more processors are configured to recognize key points of a speaker from a sign language video on a frame basis, and
predict position information of morphemes on a frame basis.

3. The sign language analysis system of claim 2, wherein the position information of the morphemes is information on frames in which morphemes are positioned among frames constituting the sign language video.

4. The sign language analysis system of claim 2, wherein the key points comprise joint information of the body and the hand of the speaker and facial expression information of the speaker.

5. The sign language analysis system of claim 1, wherein the AI model is configured to receive key points on a frame basis, to predict which morpheme a current frame corresponds to, and to output a result of predicting.

6. The sign language analysis system of claim 1, wherein the one or more processors are configured to recognize key points of a speaker from a sign language video for training, and to train the AI model by using the recognized key points and morpheme information of the sign language video for training.

7. The sign language analysis system of claim 1, wherein the one or more processors are configured to augment training data by combining morphemes outputted from the prediction unit.

8. The sign language analysis system of claim 7, wherein the one or more processors are configured to augment the training data by changing an order of the morphemes.

9. The sign language analysis system of claim 7, wherein the one or more processors are configured to augment the training data by deleting some of the morphemes.

10. A sign language analysis method comprising:
recognizing key points of a speaker from a sign language video, including extracting key-point data including body, hand, and facial features from each frame of the sign-language video so that each feature of the key-point data is recognized in a corresponding frame temporal order and frame groups, from among frames of the sign-language video, are identified as temporally contiguous frame segments each corresponding to a candidate morpheme interval according to temporal continuity of the frames in the sign language video;
inputting the recognized key points into an artificial intelligence (AI) model, and segmenting sign language into morphemes and predicting position information of the segmented morphemes using the AI model,
wherein the AI model is trained to minimize a loss in the predicting position information of the segmented morphemes and the AI model is used in performing frame-based morpheme recognition of the sign language video on a frame basis, thereby improving accuracy of sign language translation during the frame-based morpheme recognition;
generating additional training data by combining or omitting morpheme segments to enhance robustness of the AI model; and
training the AI model using training data including recognized key-point data, morpheme information of the sign language video, and the generated additional training data, thereby enhancing the robustness of the AI model.

11. A sign language analysis system comprising:
one or more processors configured to:
recognize key points of a speaker from a sign language video for training, including extracting key-point data including body, hand, and facial features from each frame of the sign-language video so that each feature of the key-point data is recognized in a corresponding frame temporal order and frame groups, from among frames of the sign-language video, are identified as temporally contiguous frame segments each corresponding to a candidate morpheme interval according to temporal continuity of the frames in the sign language video;
recognize key points of a speaker from a sign language video;
input the recognized key points into the AI model which is trained, segment sign language into morphemes, and predict position information of the segmented morphemes, wherein the AI model is trained to minimize a loss in the predicting position information of the segmented morphemes and the AI model is used in performing frame-based morpheme recognition of the sign language video on a frame basis, thereby improving accuracy of sign language translation during the frame-based morpheme recognition;

generate additional training data by combining or omitting morpheme segments to enhance robustness of the AI model; and train the AI model using training data including recognized key-point data, morpheme information of the sign language video, and the generated additional training data, thereby enhancing the robustness of the AI model.

12. A sign language analysis method comprising:

recognizing key points of a speaker from a sign language video for training, including extracting key-point data including body, hand, and facial features from each frame of the sign-language video so that each feature of the key-point data is recognized in a corresponding frame temporal order and frame groups, from among frames of the sign-language video, are identified as temporally contiguous frame segments each corresponding to a candidate morpheme interval according to temporal continuity of the frames in the sign language video;

inputting the recognized key points into the AI model, segmenting sign language into morphemes, and predicting position information of the segmented morphemes, wherein the AI model is trained to minimize a loss in the predicting position information of the segmented morphemes and the AI model is used in performing frame-based morpheme recognition of the sign language video on a frame basis, thereby improving accuracy of sign language translation during the frame-based morpheme recognition;

generating additional training data by combining or omitting morpheme segments to enhance robustness of the AI model; and training the AI model using training data including recognized key-point data, morpheme information of the sign language video, and the generated additional training data, thereby enhancing the robustness of the AI model.

13. The method of claim 12, further comprising recognizing key points of a speaker from a sign language video on a frame basis, and predicting position information of morphemes on a frame basis.

14. The method of claim 13, wherein the position information of the morphemes is information on frames in which morphemes are positioned among frames constituting the sign language video.

15. The method of claim 13, wherein the key points comprise joint information of the body and the hand of the speaker and facial expression information of the speaker.

16. The method of claim 12, wherein the AI model is configured to receive key points on a frame basis, to predict which morpheme a current frame corresponds to, and to output a result of predicting.

17. The method of claim 12, further comprising recognizing key points of a speaker from a sign language video for training, and training the AI model by using the recognized key points and morpheme information of the sign language video for training.

18. The method of claim 12, further comprising augmenting training data by combining morphemes outputted from the prediction unit.

19. The method of claim 18, further comprising augmenting the training data by changing an order of the morphemes.

20. The method of claim 18, further comprising augmenting the training data by deleting some of the morphemes.

* * * * *